United States Patent
Suh et al.

(10) Patent No.: US 6,795,749 B2
(45) Date of Patent: Sep. 21, 2004

(54) METHOD FOR AUTOMATICALLY GENERATING PART PROGRAM FOR USE IN STEP-NC

(75) Inventors: Suk-Hwan Suh, Pohang-shi (KR); Sang-Uk Cheon, Pohang-shi (KR); Byeong-Eon Lee, Pohang-shi (KR)

(73) Assignee: Postech Foundation, Kyungsangbuk-do (KR)

( * ) Notice: Subject to any disclaimer, the term of this patent is extended or adjusted under 35 U.S.C. 154(b) by 0 days.

(21) Appl. No.: 10/468,843

(22) PCT Filed: Feb. 27, 2002

(86) PCT No.: PCT/KR02/00323

§ 371 (c)(1),
(2), (4) Date: Sep. 3, 2003

(87) PCT Pub. No.: WO03/056401

PCT Pub. Date: Jul. 10, 2003

(65) Prior Publication Data

US 2004/0083023 A1 Apr. 29, 2004

(30) Foreign Application Priority Data

Dec. 31, 2001 (KR) ................ 10-2001-0088899

(51) Int. Cl.⁷ .............................. G06F 19/00
(52) U.S. Cl. ........................ 700/181; 700/86
(58) Field of Search .............. 700/181–184, 700/86–87; 345/964

(56) References Cited

U.S. PATENT DOCUMENTS 6,400,998 B1 * 6/2002 Yamazaki et al. ............ 700/86
6,512,961 B1 * 1/2003 Fukaya et al. ............... 700/174
6,556,879 B1 * 4/2003 Matsumoto et al. .......... 700/86
6,650,960 B2 * 11/2003 Kakino et al. ............... 700/173
6,671,571 B1 * 12/2003 Matsumiya et al. .......... 700/172
2003/0023336 A1 * 1/2003 Kreidler et al. ............. 700/108

FOREIGN PATENT DOCUMENTS

EP  0476139 A1  3/1992
EP  0879674 A1  11/1998

* cited by examiner

Primary Examiner—Leo Picard
Assistant Examiner—Zoila Cabrera
(74) Attorney, Agent, or Firm—Bacon & Thomas, PLLC

(57) ABSTRACT

A method for automatically generating a part program for us in a STEP-NC (STEP-Compliant Data Interface for Numerical Controls) controller in a SFP (shop-floor programming) system based on an ISO 14649 data model is provided. First, geometric kernel data is generated by interpreting a STEP physical file or an ISO 14649 part program. Then, manufacturing features are recognized from the geometric kernel data and a process plan according to the ISO 14649 is established. Thereafter, the process plan is edited and an ISO 14649 part program is generated. Subsequently, a tool path is created based on manufacturing feature information specified in the ISO 14649 part program and the produced tool path is verified in a CNC (computer-based numerical control) apparatus. By including functions of a CAD/CAPP/CAM system, the present invention makes it possible to readily generate a part program for use in the STEP-NC on the CNC controller.

6 Claims, 15 Drawing Sheets

Figure 1:
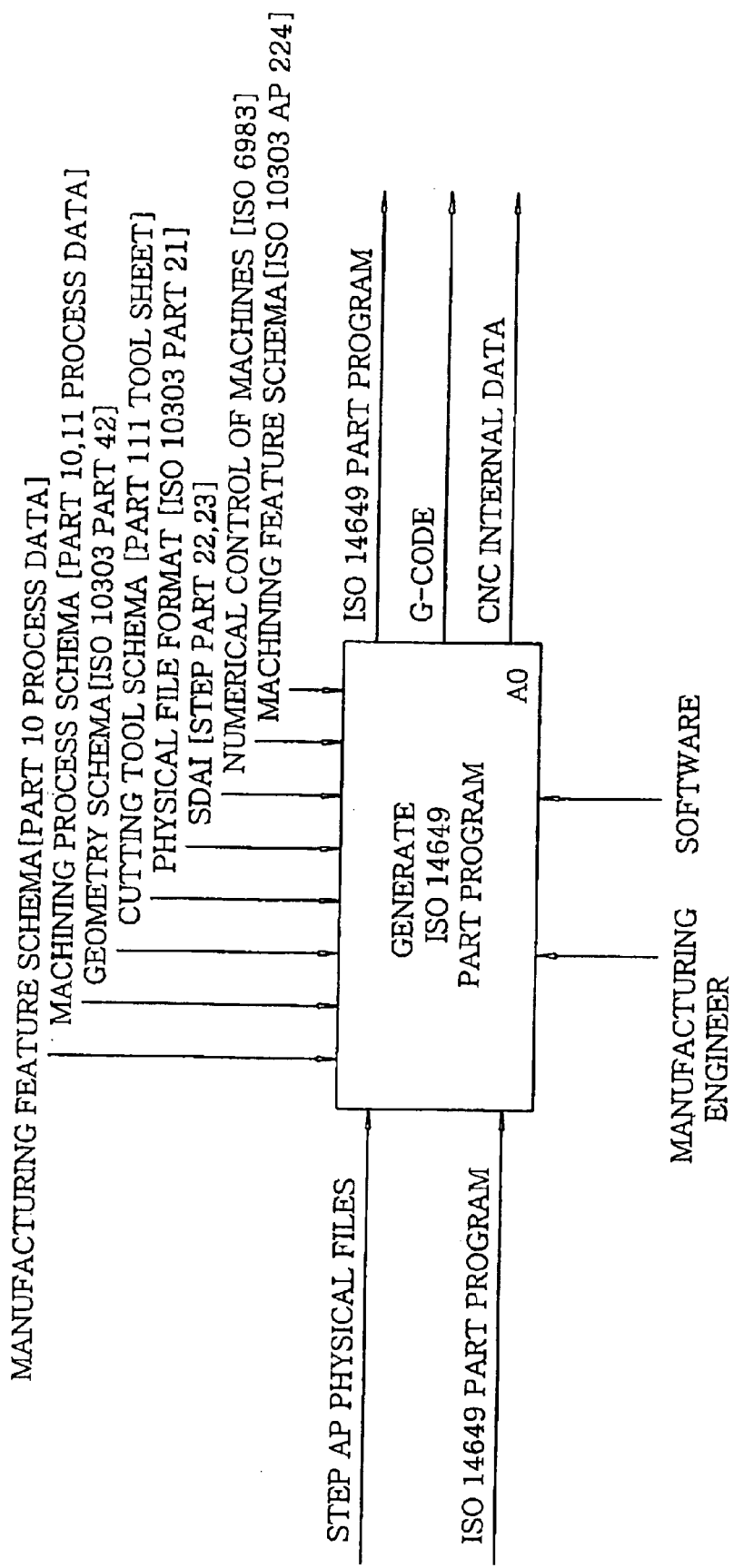

| | WORKINGSTEP | |
|---|---|---|
| ID | FEATURE | OPERATION |
| 1 | PLANAR_FACE | PLANE_ROUGH_MILLING |
| 2 | CLOSED_POCKET | BOTTOM_AND_SIDE_ROUGH_MILLING |
| 3 | ROUND_HOLE | DRILLING |
| 4 | ROUND_HOLE | DRILLING |
| 5 | SLOT | BOTTOM_AND_SIDE_ROUGH_MILLING |
| 6 | SLOT | BOTTOM_AND_SIDE_ROUGH_MILLING |
| 7 | ROUND_HOLE | DRILLING |
| 8 | SLOT | BOTTOM_AND_SIDE_ROUGH_MILLING |

METHOD FOR AUTOMATICALLY GENERATING PART PROGRAM FOR USE IN STEP-NC

FIELD OF THE INVENTION

The present invention relates to a shop-floor programming (SFP) system for a STEP-NC controller and a method for generating a part program for use in the STEP-NC controller by using an ISO 14649 data model.

BACKGROUND OF THE INVENTION

A shop-floor programming (SFP) system refers to a system including all essential functions required to create and verify a part program on a computer-based numerical control (CNC) apparatus. By using such a SFP system, functions of a CAD/CAM system, which is operated independently of the CNC system in an off-line condition, can be performed at a shop-floor. Conventionally, there has been developed by several CNC manufacturers a SFP system capable of producing a part program through the use of G codes in accordance with ISO 6983. However, such a SFP system has been implemented as an interactive SFP system that can be applied to a numerical control apparatus of only the manufacturers who developed that system. As such SFP systems, there exist, for example, Blue-print/Support programming and WOP system of Siemens, Super-CAP system of FANUC, an interactive programming system of MAZAK, Compact programming system of YASNAC, etc.

The above-mentioned ISO 6983 is widely used as a standard of data interface for a Numerical Control (NC) apparatus in a manufacturing process. However, the ISO 6983 is a low-level international standard that just defines an axis movement command (G-code) and a switching command (M-code). Thus, with these low level commands, a post-processor should produce a part program having a tremendously large size, wherein maintenance and decoding of the produced part program is very difficult. Furthermore, since the ISO 6983 only supports linear and circular movements, a geometry having a more complicated form, e.g., a spline, cannot be produced by using the ISO 6983 standard. Several CNC manufacturers attempt to solve this problem by adding to the ISO 6983 standard high-level commands of their own. However, since each of the manufacturers has their own standard, compatibility of the part programs is reduced. In addition, since the SFP system using the G-codes according to the ISO 6983 standard is manually operated by using the G-code and the M-code, various production information such as machining features, a machining process, a machining technology, cutting tools, machining knowledge and feature information may not be included in the part program.

As a solution to the above-mentioned drawbacks of the ISO 6983, ISO 14649 standard has been introduced. The ISO 14649 defines a method for incorporating a variety of production information in a new type part program that is different from the prior one using the G-codes. The ISO 14649, which is instituted to define an interface for use in information exchange between a CAD/CAM system and CNCs, accepts the definition of STEP (Standard for the Exchange of Product Model) as it is or more specifies the definition to make it more adequate for the CNC. Accordingly, a system adopting the ISO 14649 standard exhibits a highly improved compatibility with up-coming data and other systems. Further, the system according to ISO 14649 standard can utilize information generated at a CAD/CAM system where the STEP is currently employed as an exchange information model. Still further, a part program in the system according to the ISO 14649 can be easily modified and becomes to have a systematic and hierarchical interface grammar.

In the meanwhile, the part program created by using the conventional G-codes according to IS 6983 is either directly produced by a manufacturing engineer or modified by a machinist after being produced at an off line CAM system. Alternatively, the part program is created by an interactive programming system included in a CNC controller. Accordingly, a part program for manufacturing a comparatively simple geometry, not a complicated one, is created and modified by an expert machinist in a manual mode.

However, the part program for use in the STEP-NC (STEP-Compliant Data Interface for Numerical Controls) in accordance with the ISO 14649 should contain therein a variety of production information such as machining features, a machining process, a machining method, cutting tools, machining technology and geometry information. Moreover, the part program should describe exact parameters for defining the above-cited various production information. That is, it is difficult for even an expert machinist to create or modify a part program in accordance with the ISO 14649 for the purpose of manufacturing just a simple feature as well as a complicated one, which is quite different from a case of a part program generated according to G-codes.

Therefore, there has been intensified a demand for a technique capable of automatically producing a part program for use in the STEP-NC.

SUMMARY OF THE INVENTION

It is, therefore, an object of the present invention to provide a method for automatically producing a part program for use in a STEP-NC and CNC internal data by using CAD data generated according to STEP.

In accordance with the present invention, there is provided a method for automatically generating a part program for a STEP-NC (STEP-Compliant Data Interface for Numerical Controls) in a SFP (shop-floor programming) system based on an ISO 14649 data model, the method comprising the steps of: (a) generating geometric kernel data by interpreting a STEP physical file or an ISO 14649 part program; (b) recognizing manufacturing features from the geometric kernel data; (c) setting a process plan according to the ISO 14649 on the basis of the manufacturing features; (d) editing the process plan; (e) generating an ISO 14649 part program from the edited process plan; (f) generating a tool path based on manufacturing feature information specified in the ISO 14649 part program; and (e) verifying the produced tool path in a CNC (computer-based numerical control) apparatus.

BRIEF DESCRIPTION OF THE INVENTION

Figure 2A:
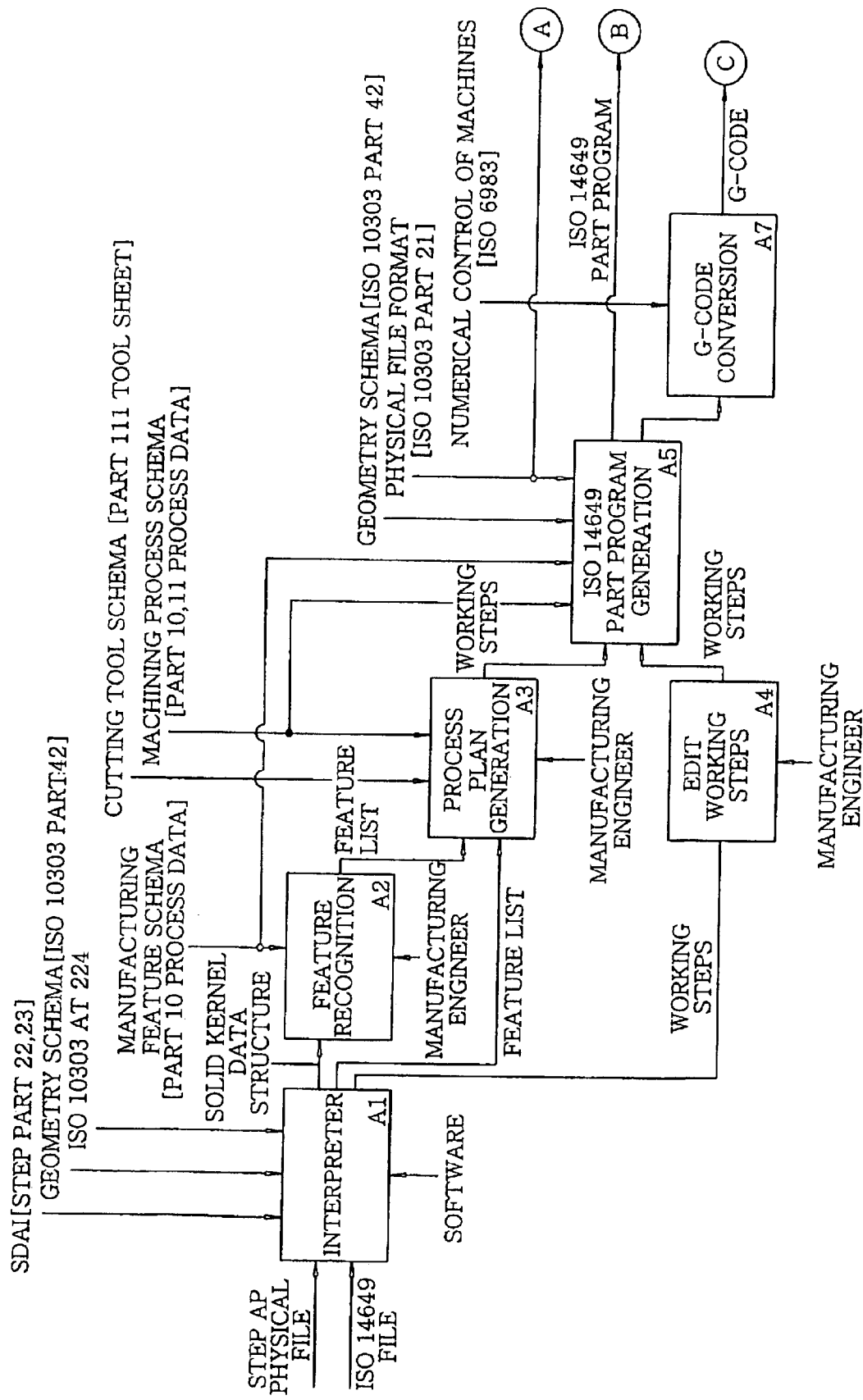
Figure 2B:
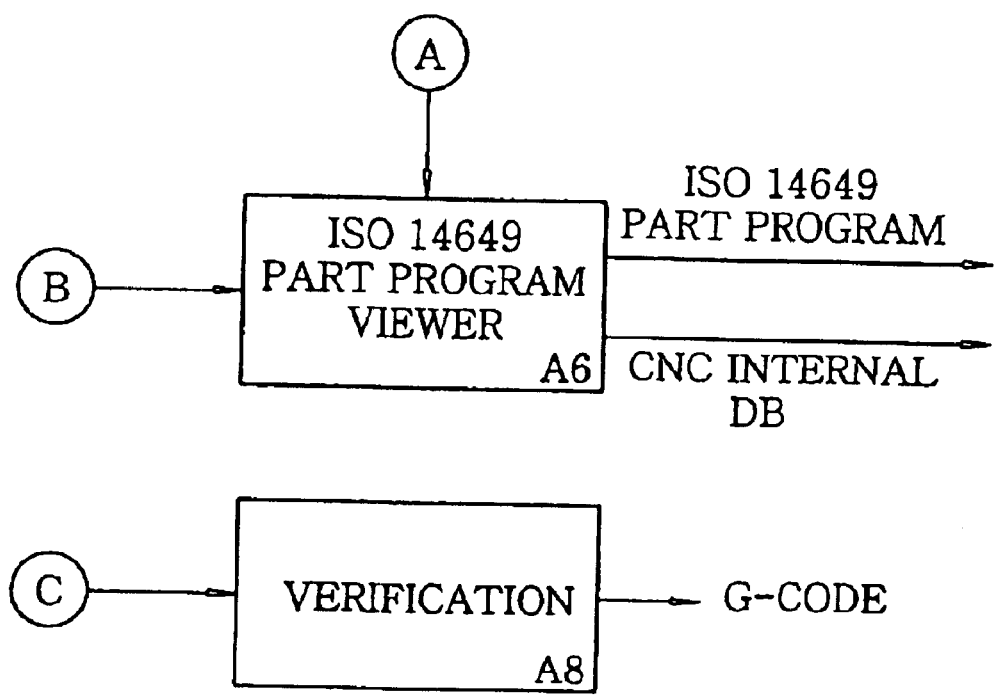
Figure 3:
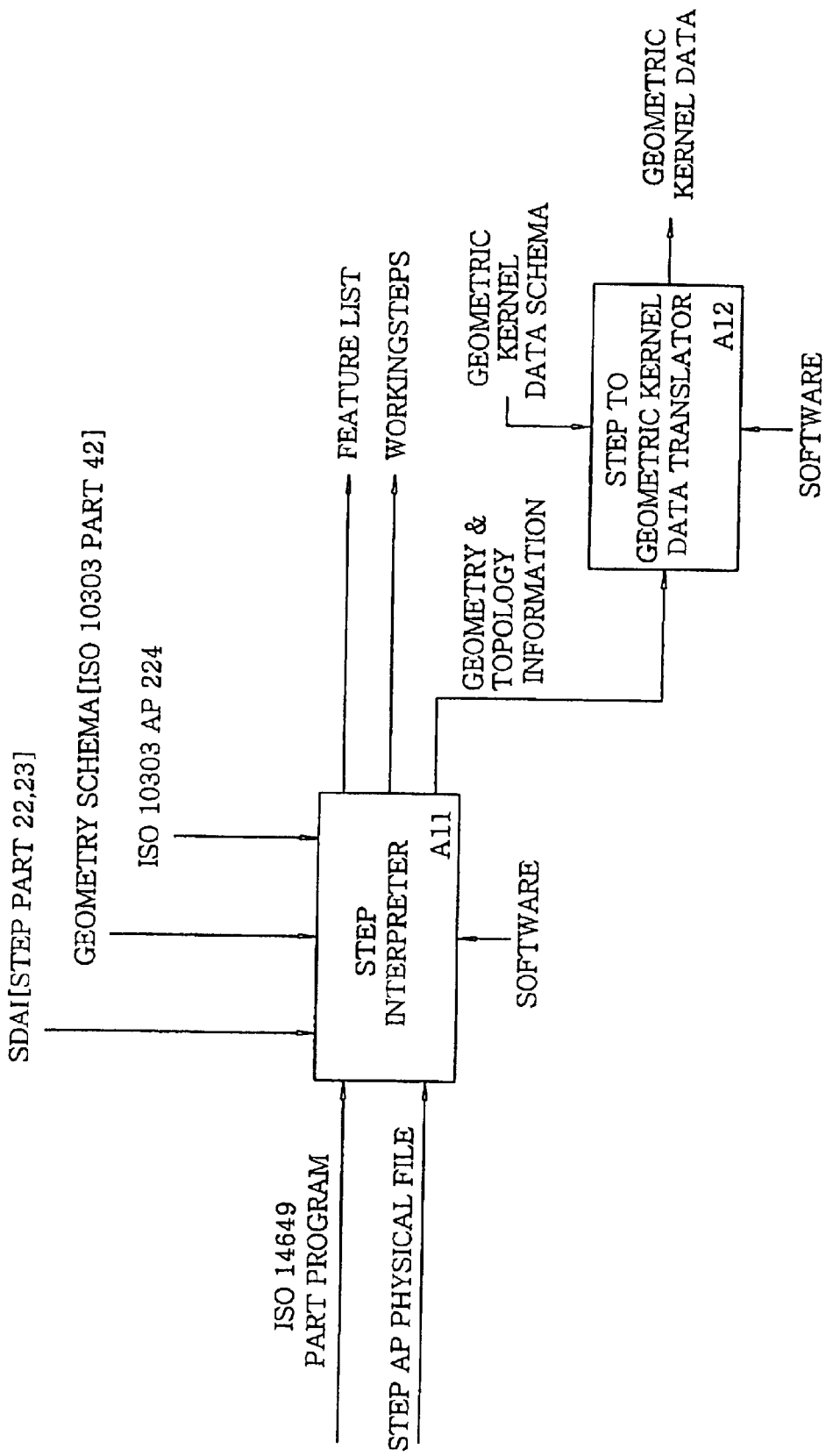
Figure 4:
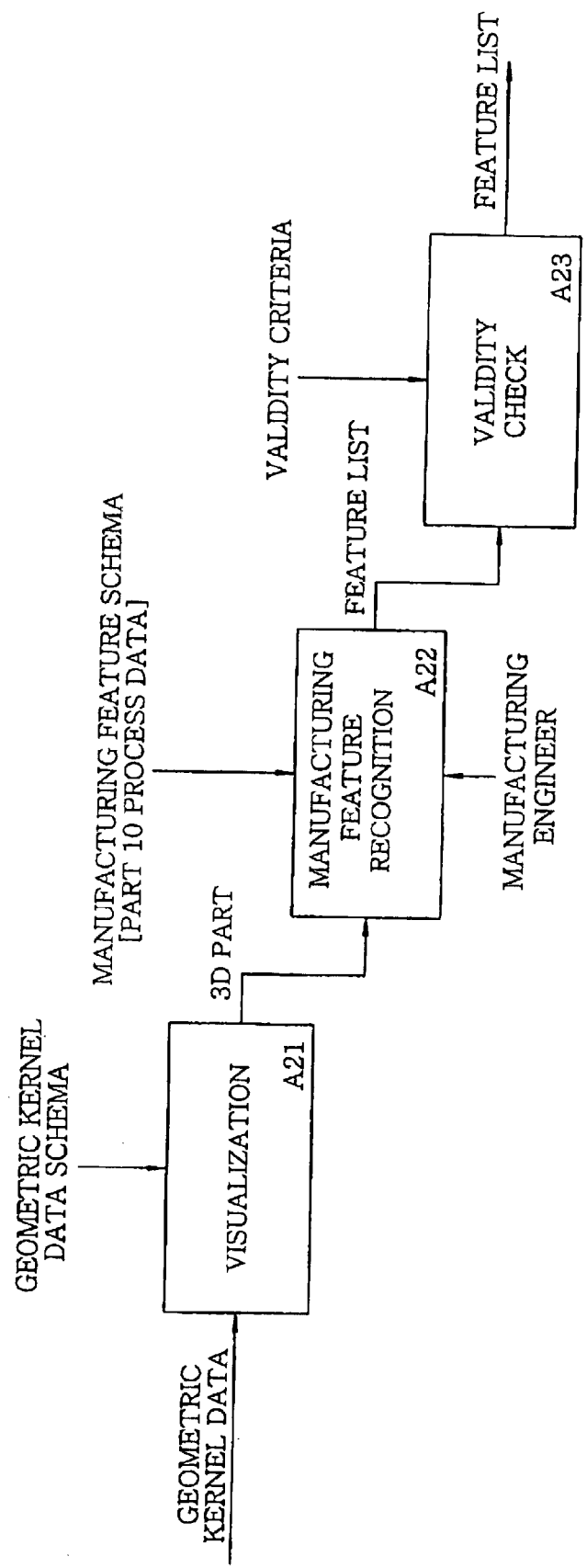
Figure 5:
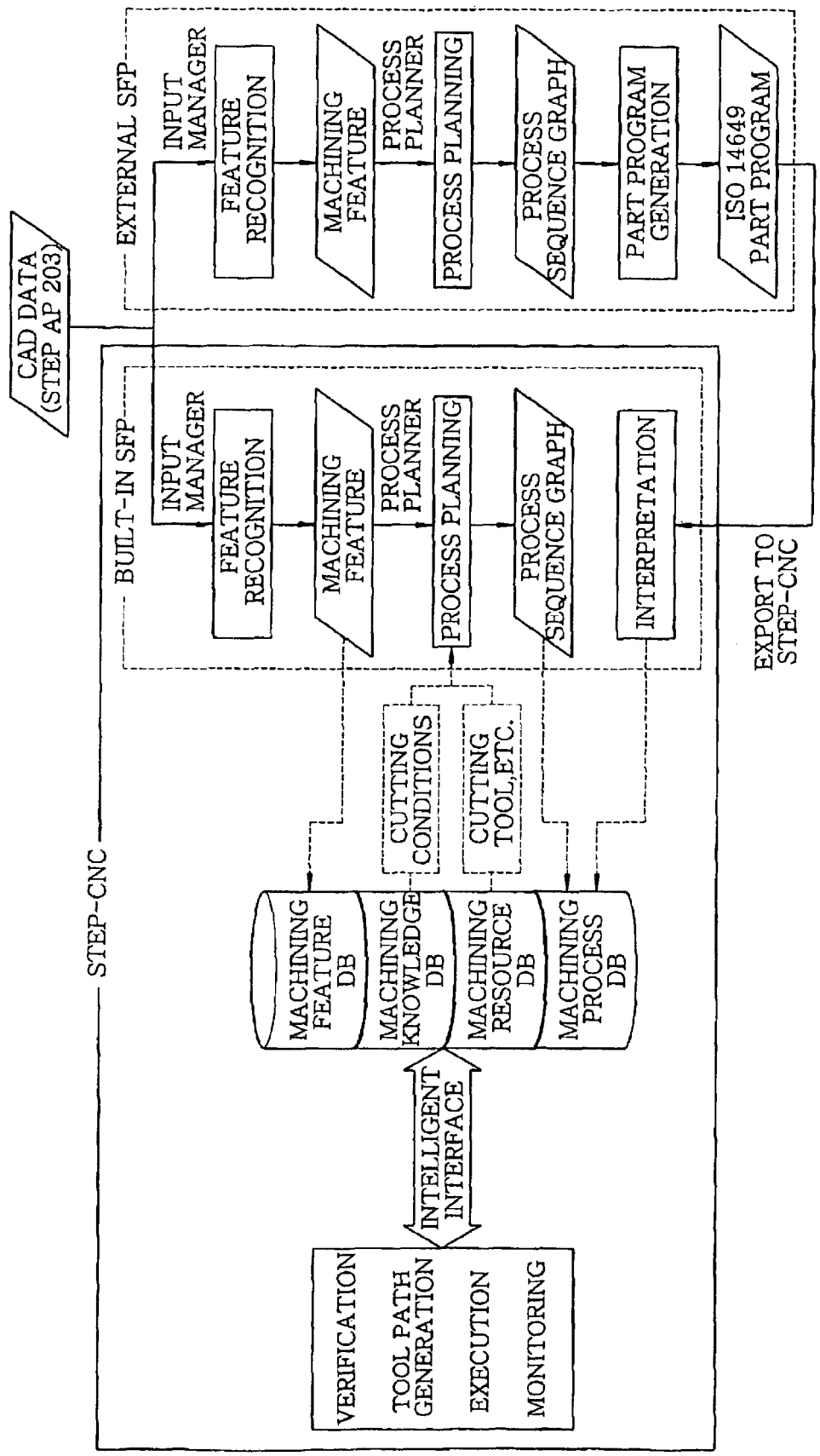
Figure 6:
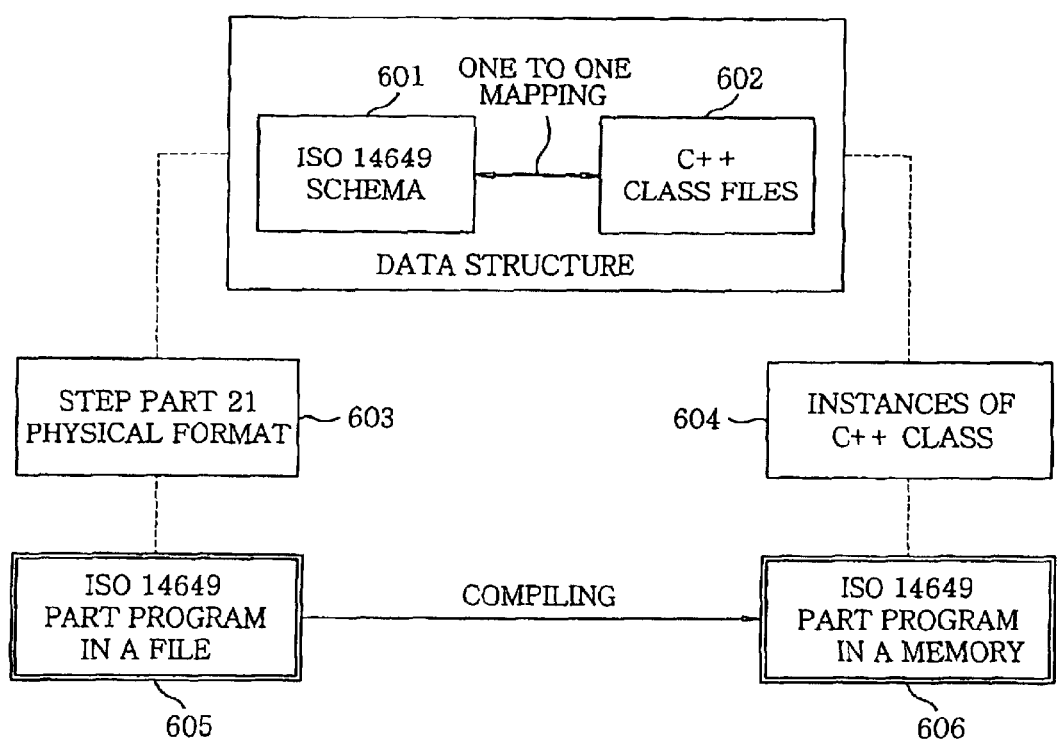
Figure 7:
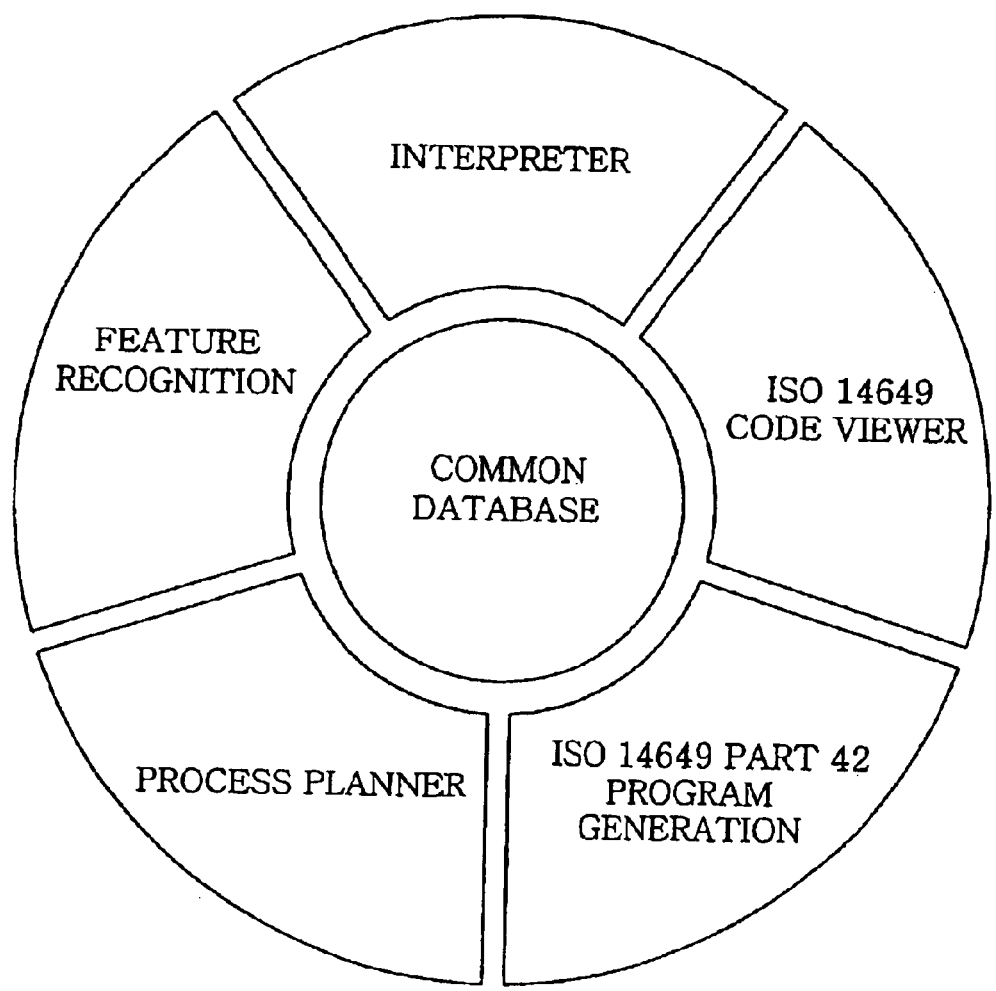
Figure 8:
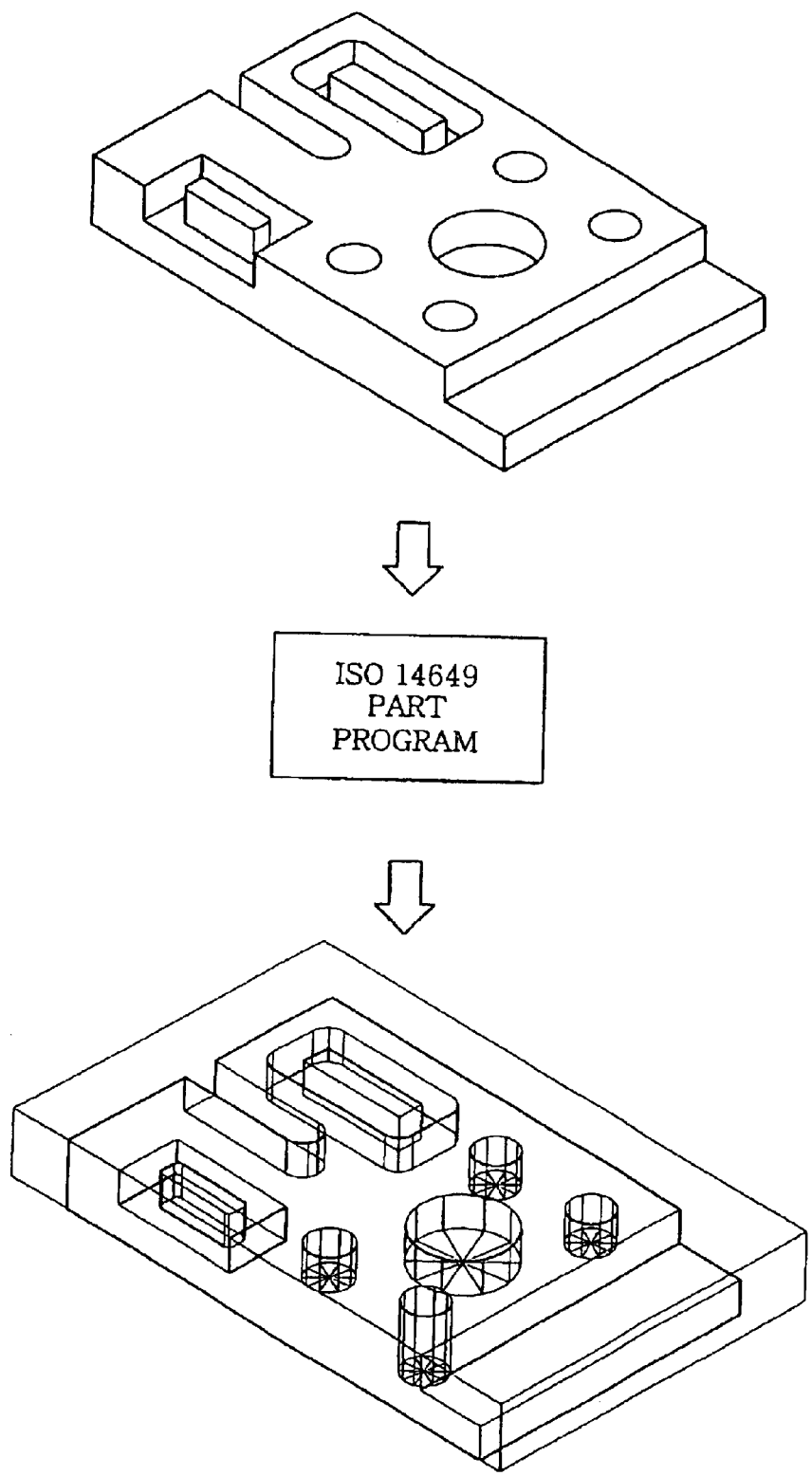
Figure 9:
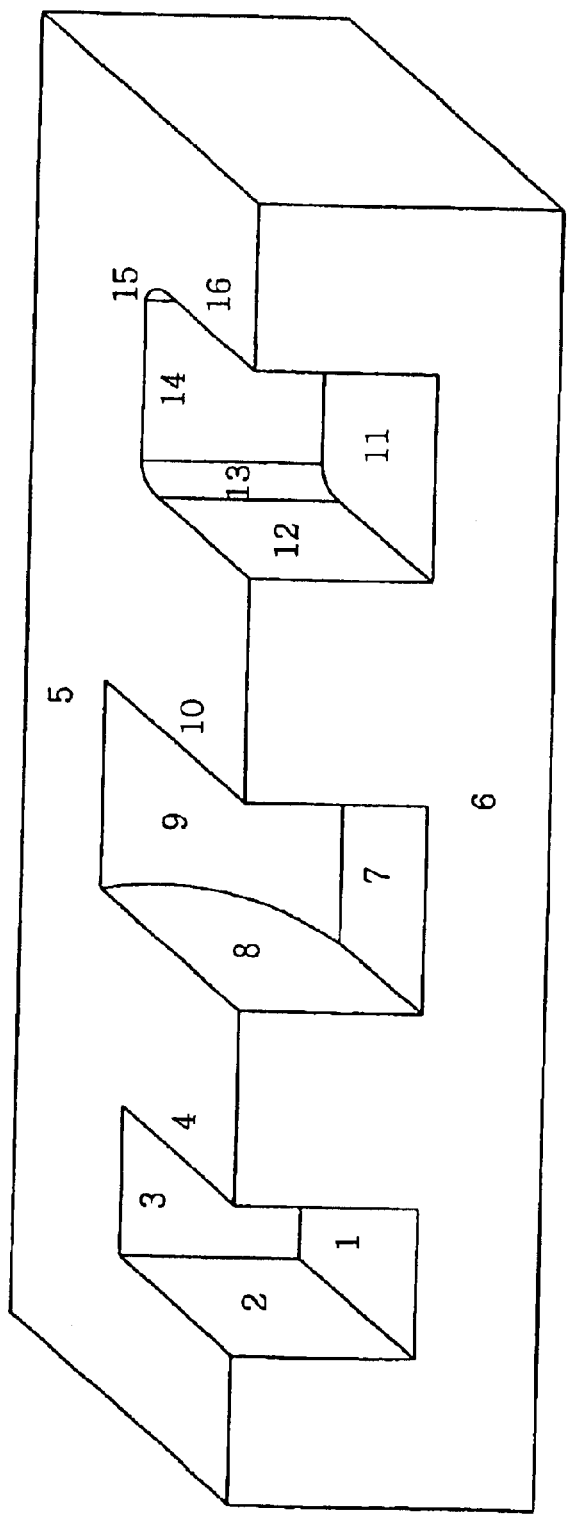
Figure 9:
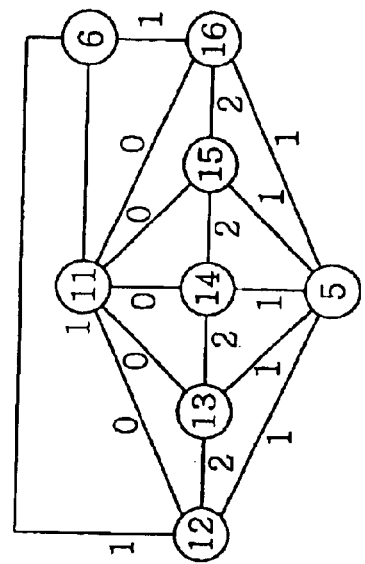
Figure 9:
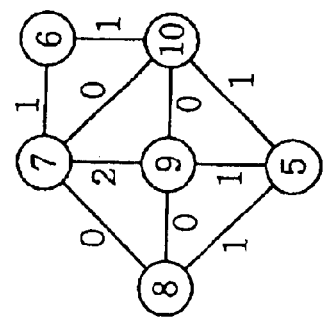
Figure 9:
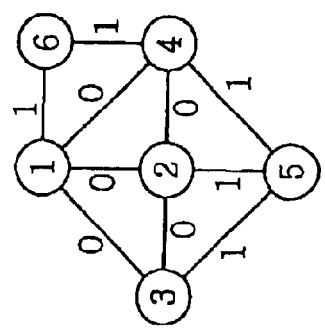
Figure 10A:
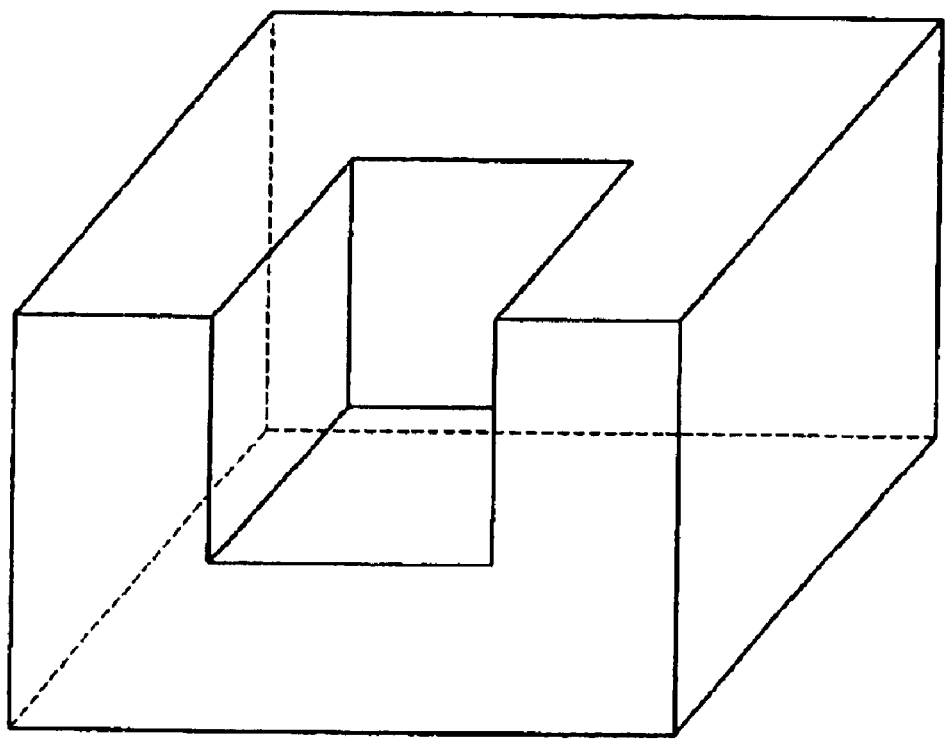
Figure 10A:
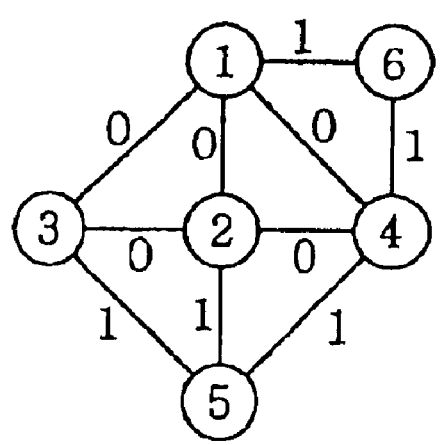
Figures 11A, 11B:
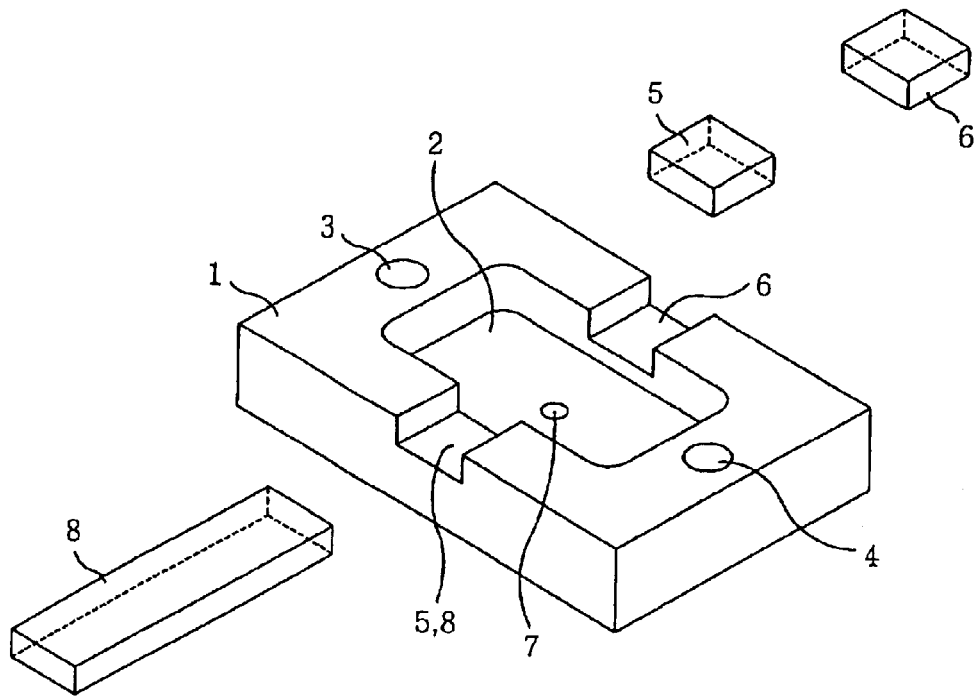
Figure 11C:
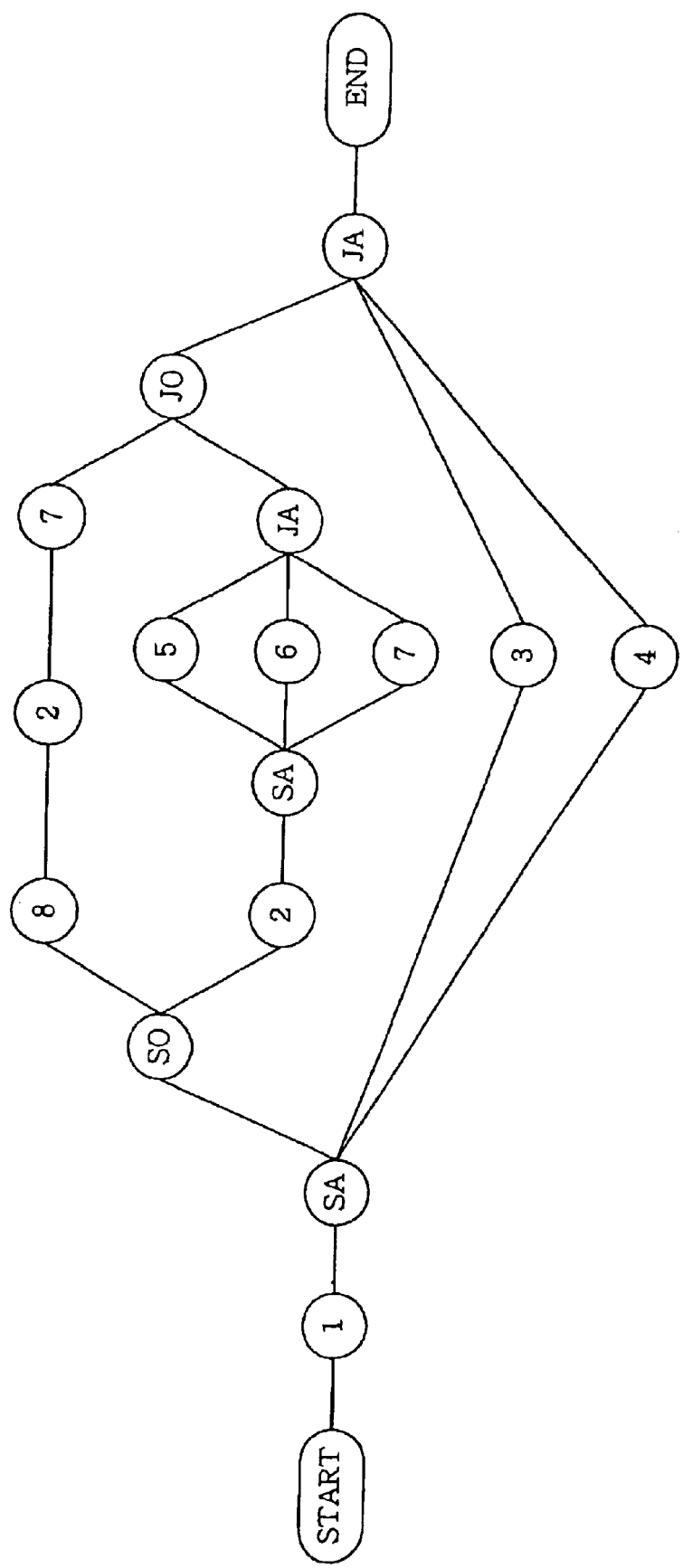
Figure 12:
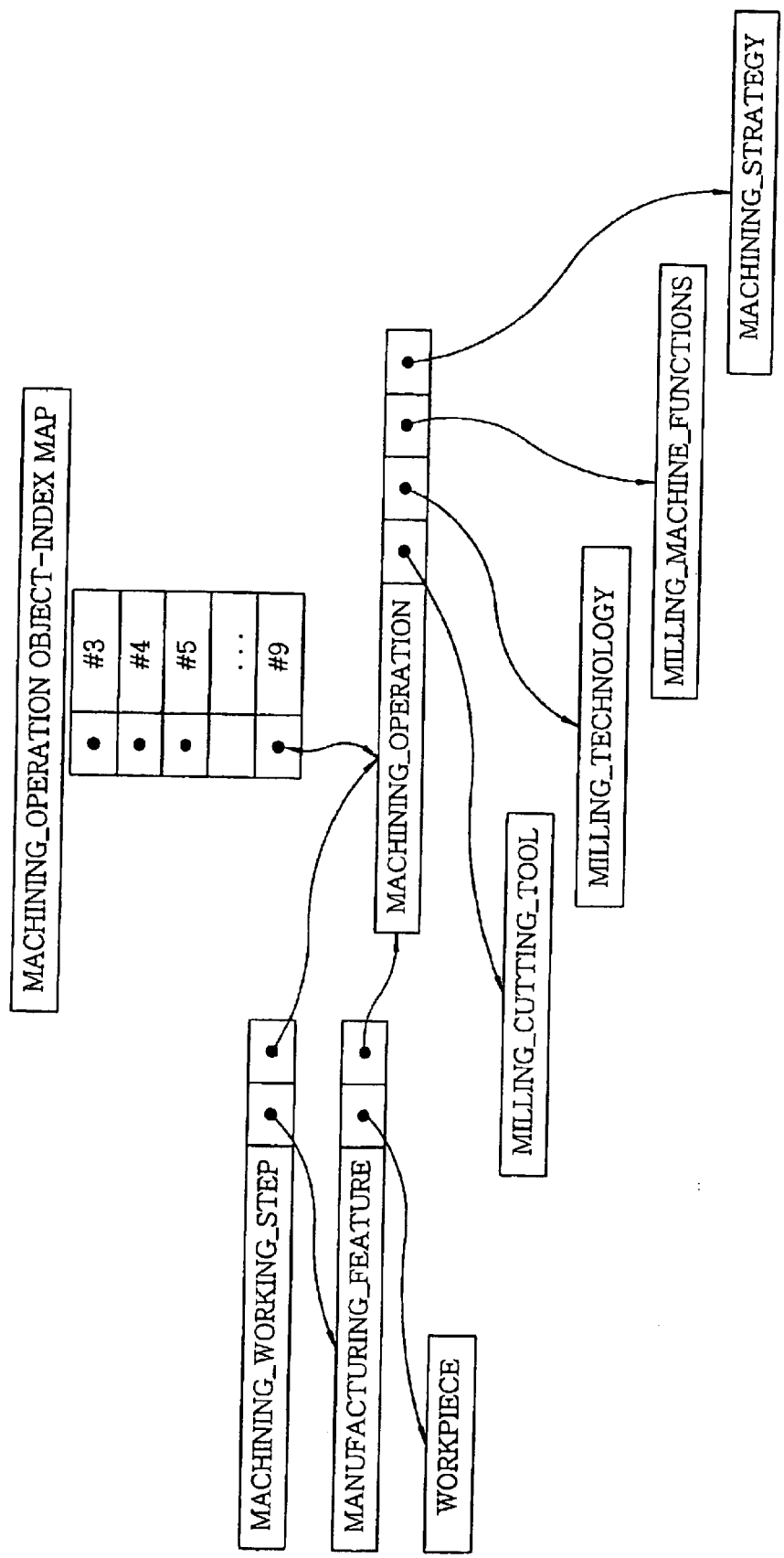

The above and other objects and features of the present invention will become apparent from the following description of preferred embodiments given in conjunction with the accompanying drawings, in which:

FIG. 1 is a block diagram for describing an input/output and a control mechanism of a SFP system for use in a STEP-NC in accordance with the present invention;

FIG. 2. provides a block diagram for illustrating the structure of the SFP system shown in FIG. 1;

FIG. 3 sets forth a detailed block diagram of part A1 in FIG. 2 for describing a STEP-NC interpreter and a STEP interpreter;

FIG. 4 offers a detailed block diagram of part A2 in FIG. 2 for describing a process for recognizing manufacturing features;

FIG. 5 compares a built-in SFP system with an external SFP system;

FIG. 6 depicts a block diagram for describing the structure of an ISO 14649 part program interpreter;

FIG. 7 demonstrates major parts of a SFP system for use in a STEP-NC;

FIG. 8 illustrates a process conducted in a code viewer for use in a STEP-NC;

FIG. 9 describes a pattern-based process for recognizing manufacturing features according to ISO 14649;

FIG. 10 shows a hint-based process for recognizing manufacturing features according to ISO 14649;

FIG. 11 explains a non-linear process plan performed in case an interference occurs between manufacturing features; and FIG. 12 describes a process for generating a physical file from an instance according to ISO 14649 stored in a memory.

DESCRIPTION OF SPECIFIC EMBODIMENTS

Referring to FIG. 1, there is provided a block diagram for describing an input/output and a control mechanism of a shop-floor programming (SFP) system for use in a STEP-NC (STEP-compliant data interface for numerical controls) in accordance with the present invention. The SFP system receives a STEP physical file defining a part to be finally produced (hereinafter, finished part) and generate an ISO 14649 part program with reference to Parts 10, 11, 111 of ISO 14649 and Parts 21, 42, 203, 22, and 23 of ISO 10303. The part program generating process in accordance with the present invention is controlled by a manufacturing engineer, a tool path generator according to ISO 14649 and a process planning software program. Though a basic output of such a process is the ISO 14649 part program as shown in FIG. 1, an ISO 6983 G-code part program can also be produced for the compatibility with prior arts. Further, in case the SFP system of the present invention is built in a CNC (computer-based numerical control) system, CNC internal data for driving a CNC motor can be outputted to remove a stage for interpreting the ISO 14649 part program and to integrate the SFP and the CNC system.

Referring to FIG. 2, there is provided a detailed block diagram of the SFP system shown in FIG. 1. An interpreter A1 receives as an input thereto either the STEP physical file containing the finished part information or the ISO 14649 part program.

FIG. 6 illustrates an exemplary structure of an ISO 14649 part program interpreter, which is identical with the interpreter A1 shown in FIG. 2. The ISO 14649 part program interpreter operates as follows. First, C++ class files 602 individually corresponding to an ISO 14649 scheme 601 are designed and created beforehand. The ISO 14649 schema 601 designates the structure of data files according to a STEP part 21 physical format 603 and the C++ class files 602 show the structure of instances of C++ classes. In other words, the data according to the STEP part 21 physical file format 603 is converted to the instances 604 of the corresponding C++ class. To be more specific, the ISO 14649 interpreter reads and compiles the ISO 14649 part program to generate the instances 604 of the $C^{++}$ class corresponding to the data structure defined by the ISO 14649 schema 601 and, then, determines the value of each member of the instances 604 by considering characteristic factors of the data structure. Data interpretation process for ISO 10303 physical file is the same as that for the ISO 14649 physical file described above excepting that ISO 10303 schema is employed in lieu of the ISO 14649 schema.

FIG. 3 offers a detailed block diagram of the interpreter A1 shown in FIG. 2. A STEP interpreter A11 performs one part of the part program generating process described above with reference to FIGS. 2 and 6. The STEP interpreter A11 outputs workingstep information when the ISO 14649 is inputted and outputs manufacturing feature list or geometry and topology information when the STEP physical file is inputted. If the inputted STEP physical file is AP224 data, the output of the STEP interpreter A11 is the manufacturing feature list and if the inputted STEP physical file is AP203 or AP214 data, the output of the STEP interpreter A11 is the geometry and topology information. In case the output of the STEP interpreter A11 is the manufacturing feature list, the next step is performed in a process plan generator A3 shown in FIG. 2 while in case the output of the STEP interpreter A11 is the workingstep information, the next process is performed in a workingstep editor A4 shown in FIG. 2.

If the STEP interpreter A11 reads the already created ISO 14649 part program and edit the program by adding, deleting or modifying a certain information, the output of the STEP interpreter A11 becomes the workingsteps information. If the STEP physical file inputted to the STEP interpreter A11 is composed of the AP224 data representing the part to be finally produced in a feature-based CAD system, the output of the STEP interpreter A11 becomes the manufacturing feature list. In this case, since the AP224 features are design features, a process for converting the design features to machining features is required. If the output of the STEP interpreter A11 is the geometry and topology information, the next step is performed in a STEP to geometric kernel data translator A12 shown in FIG. 3 where the to-be-produced part is constructed in advance to extract the machining feature information from the geometry and topology information.

The STEP to geometric kernel data translator A12 translates the geometry and topology information defined according to the STEP standard into geometric kernel data. The geometry kernel data refers to data including information on the part to be finally produced in the SFP system, the kernel data being stored in a memory and displayed later. Based on the geometric kernel data, the manufacturing features can be automatically recognized. The geometric kernel data outputted from the STEP to geometric kernel data translator A12 is inputted to the manufacturing feature recognition module A2 shown in FIG. 2. FIG. 4 provides a detailed block diagram of the manufacturing feature recognition module A2, which includes various units for visualizing the geometric kernel data, recognizing manufacturing features from the geometric kernel data and checking the validity of the recognized manufacturing features. The manufacturing feature recognition module A2 recognizes the manufacturing features defined according to the ISO 14649 by applying, e.g., a pattern-based, a hint-based or a volume decomposition technique to the geometric kernel data.

Figure 10B:
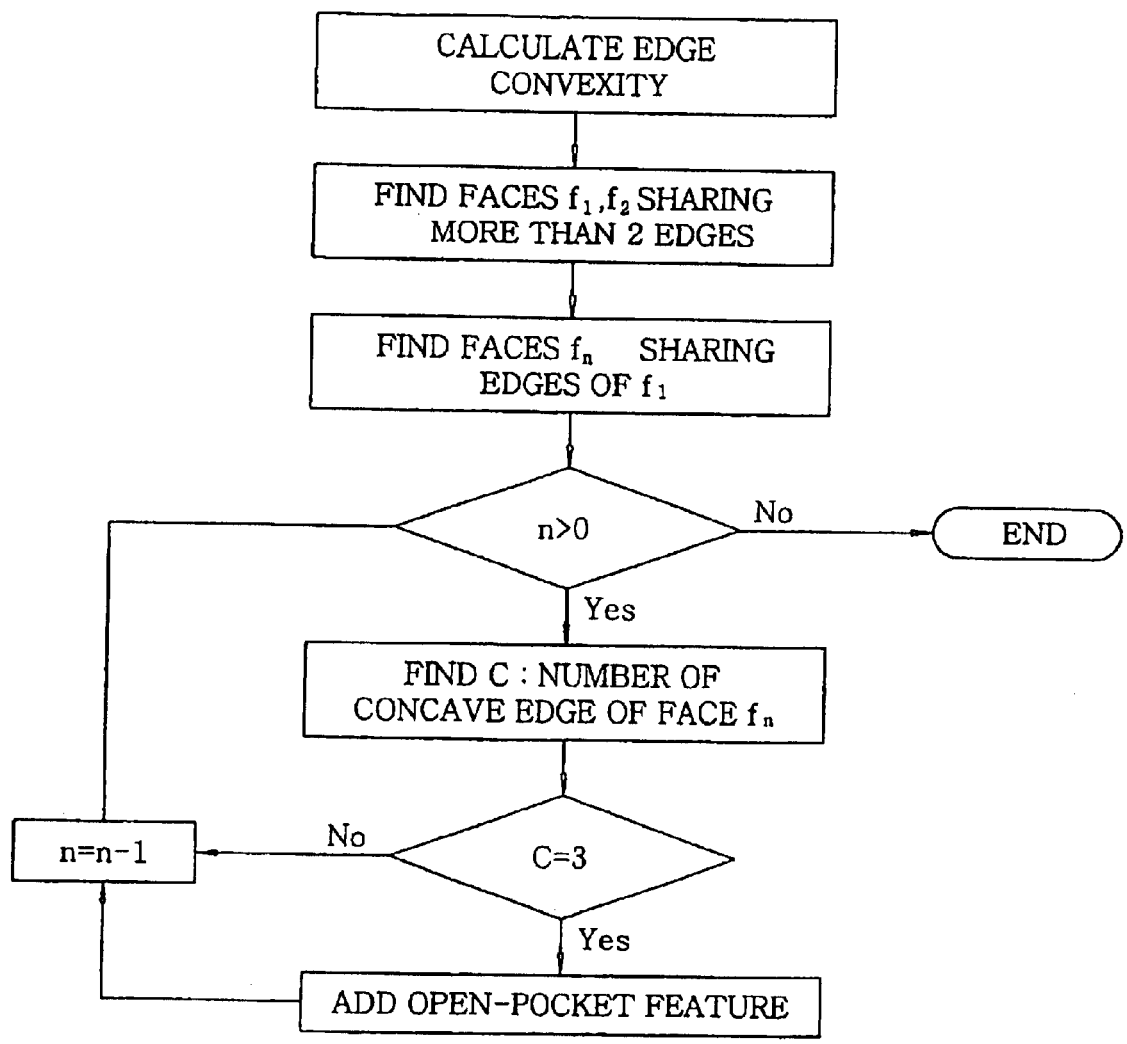

Referring to FIG. 9, there is demonstrated a graph for describing the geometry and topology information of three different slots having different forms, wherein the information is generated by the manufacturing feature recognition module A2 using the pattern-based recognition technique. FIG. 10A describes the geometry and topology information of a pocket, wherein the information is generated by the manufacturing feature recognition module A2 using the hint-based technique. FIG. 10B shows an algorithm of the hint-based technique employed in creating the graph shown in FIG. 10A.

After recognizing the manufacturing features, the manufacturing feature recognition module A2 automatically extracts parameters that define the recognized manufacturing features. Such parameters include enough information to define the manufacturing features and are used later to produce a tool path. The automatically extracted parameters are basically defined according to the ISO 14649. However, the manufacturing feature recognition module A2 can also extract additional parameters which are not defined by the ISO 14649, e.g., a parameter for showing a relationship between the manufacturing features, the additional parameters being utilized later in producing the tool path. Meanwhile, the recent feature recognition technology cannot automatically recognize a complicated feature which is, for instance, an interference between other features. In such a case, the complicated feature should be visualized and the operator should designate the corresponding manufacturing features in the manual mode or by using an interactive method. If there occur interferences between the manufacturing features, the feature may be recognized totally different from that originally desired depending on the interpretation result of those manufacturing features. If this information is employed in generating the process plan, the non-linear process plan may be obtained.

FIG. 11A shows a finished part obtained in case there exists interference between the manufacturing features and FIG. 11B provides an interpretation result of the manufacturing features in FIG. 11A and the machining operations corresponding to each of the manufacturing features. FIG. 11C illustrates an example of the non-linear sequence of the working steps.

As shown in FIG. 2, the manufacturing features recognized by the manufacturing feature recognition module A2 is inputted to the process plan generator A3. Then, a process plan generating process is performed as follows. First, a machining operation is allocated to each of the manufacturing features and process data for the respective machining operations are determined. Thereafter, workingsteps are created by considering the manufacturing features and the machining operations. Subsequently, the workingsteps are classified into several groups and the sequence of the workingsteps is determined.

A more detailed description of the above-cited process plan generating process is provided as follows. First, one machining operation is selected among, e.g., a rough cutting, a semi-finish cutting or a finish cutting for each of the manufacturing features. Then, the process data is created for each of the machining operations, wherein the process data includes cutting tools information, a machining strategy for designating a basic machining pattern, a tool-accessing/withdrawing method, cutting conditions such as a depth of cutting, an RPM and a feed rate, a method for connecting the tool paths, information directing whether or not to use cutting oil, etc. Then, the workingsteps are determined by using each set of the manufacturing feature and the corresponding machining operation. Thereafter, it is decided how many setups are required by considering a machining possibility, used tools, tool path connections between the workingsteps, and so forth. The setups function as criteria for classifying the workingsteps into the several groups and, especially, for determining the sequence of the workingsteps.

As explained before with reference to FIG. 11C, if there occurs interference between the manufacturing features, the process plan produced from the above described process plan generating process may not be a linear one having a series of processes to be performed in the predetermined order but may be a non-linear one having several possible performance channels. Further, in the process of determining the machining operation for each manufacturing feature and setting the process data for each machining operation, an expert system is used instead of a machinist to provide a proper data through an inference. In this case, the machinist only has to decide whether or not to use the data suggested by the expert system unlike in a conventional case where the machinist should selects every required data in a manual mode. Herein, the workingstep information, which is outputted from the process plan generator A3, designates the sequence of the workingsteps, which is expressed by using a process sequence graph (PSG).

Meanwhile, as shown in FIG. 2, in case the output of the interpreter A1 is the workingstep information, the outputted workingsteps are inputted to the workingstep editor A4. The workingstep editor A4 provides the manufacturing engineer with an opportunity to verify or modify the already created ISO 14649 part program. The term 'workingstep' herein used not only implies the workingstep as an entity defined by the ISO 14649 but also refers to all the possible information that can be obtained by using the workingsteps, e.g., the manufacturing feature information, the machining operations, the process data defining the machining operations, the process sequence and so forth. In other words, the term 'workingstep' used in the present invention refers to the part program itself created by using the workingsteps. If the manufacturing engineer intends to verify or modify the ISO 14649 part program generated by using the workingsteps, it is preferable to use a GUI (graphic user interface) that visualizes the manufacturing features.

As shown in FIG. 2, the present invention provides a module named Code Viewer A6 for re-constructing the manufacturing features defined in the part program through the use of three-dimensional images, as shown in FIG. 8, to facilitate the verification or the modification of the ISO 14649 part program. If the manufacturing engineer selects the manufacturing features displayed three-dimensionally on a screen and confirms and modifies the corresponding feature parameters, the Code Viewer immediately displays the confirmation and modification result on the screen. If the manufacturing engineer verifies or modifies a process sequence, the modified process sequence is shown on the screen as a two-dimensional graph, i.e., PSG, or a table. Once the process sequence is expressed through the PSG, the manufacturing engineer can change the process sequence by moving nodes of the graph in a drag-and-drop mode.

An ISO 14649 part program generator A5 shown in FIG. 2 generates the ISO 14649 part program. A data portion of the part program includes a memory address of all the instanced entities and entity-index maps between objects and indexes in a regular sequence. The maps respectively correspond to the manufacturing feature, the machining operation, machining strategy and the cutting tool. If such maps are successively stored in files, the creation of the data portion in the part program is completed. A header portion of the part program is independently generated on the basis of additional information that the machinist inputs. FIG. 12 illustrates an exemplary structure of the entity-index map of the machining operation. If both the data portion and the header portion of the part program are generated, the ISO 14649 part program generating process is terminated.

As shown in FIG. 2, the SFP system in accordance with the present invention can output the G-code part program as well as the ISO 14649 part program. In other words, the SFP system of the present invention can be applied to an old-model CNC apparatus as well as a STEP-compliant CNC apparatus based on the ISO 14649. In order to generate the G-code part program, tool paths should be prepared from the ISO 14649 part program. A G-code converter A7 illustrated in FIG. 2 performs such a tool path generating process. The G-code converter A7 may be either integrated in the SFP system in accordance with the present invention or be implemented as a sub-module separated from the SFP system. In case the G-code converter A7 is integrated in the SFP system, the G-code converter A7 directly uses the data stored in the memory instead of the part program data file generated by the ISO 14649 part program generator A5 to produce the tool paths. In case the G-code converter A7 is prepared as the sub-module independent from the SFP system, on the other hand, the G-code converter A7 employs the part program data file generated by the part program generator A5 to produce the tool paths and uses the interpreter A1 to interpret the part program data file. Though the G-code converter A7 creates the tool paths in response to instructions from the ISO 14649 part program, the G-code converter A7 can also produce a safe connection tool path on its own on the basis of the manufacturing feature information in case, e.g., a method for connecting the tool paths between the manufacturing features is not specified in the ISO part program.

If the SFP system in accordance with the present invention is integrated in the CNC apparatus, the G-code converter A7 becomes to output the CNC internal data having a format only useful for the CNC apparatus in addition to the G-code part program for use in the old-modeled CNC. The CNC internal data has the tool path information having switching instructions. After being verified by a verifier A8 shown in FIG. 2, the CNC internal data can be used as an instruction for directly operating an axis of the CNC apparatus without undergoing through a separate conversion process. The verifier A8 uses either a wire simulation technique where the trace of the tool paths are detected and checked through a three-dimensional visualization or a solid simulation technique where the tool paths are verified by performing a boolean operation (a difference set operation) to a material and a locus volume of the tool paths. The solid simulation technique particularly exhibits an excellent efficiency in estimating whether the machined feature is overcut or under-cut by comparing the manufacturing feature with the designed feature. In the comparison of the manufacturing feature with the designed feature, a method used for the comparison of discrete models such as a dexel or a Z-map is employed. Herein, the comparison between B-Rep models may not be implemented in the CNC apparatus since such a comparison involves a difficult calculation and is very time-consuming.

Referring to FIG. 5, there is provided a block diagram showing an operational difference between the built-in SFP system and the external SFP system, wherein the built-in SFP system refers to the SFP system integrated in the CNC while the external SFP system refers to the SFP system installed separated from the CNC, as described before. In case of the built-in SFP system, the SFP system shares with the CNC apparatus a machining feature database, a machining knowledge database, a machine resource database and a machining process database. Further, the built-in SFP system directly transfers the PSG to the CNC apparatus instead of generating the ISO 14649 part program.

As described above, the present invention provides the SFP system and the method for automatically generating the part program for use in the STEP-NC, wherein the manufacturing features are automatically recognized by using the feature information generated from the CNC apparatus and the machining method, the machining process, the machining technology and the cutting tools are selected for each of the manufacturing features.

While the invention has been shown and described with respect to the preferred embodiment, it will be understood by those skilled in the art that various changes and modifications may be made without departing from the spirit and scope of the invention as defined in the following claims.

What is claimed is:

1. A method for automatically generating a part program for a STEP-NC (STEP-Compliant Data Interface for Numerical Controls) in a SFP (shop-floor programming) system based on an ISO 14649 data model, the method comprising the steps of:

(a) generating geometric kernel data by interpreting a STEP physical file or an ISO 14649 part program;

(b) recognizing manufacturing features from the geometric kernel data;

(c) setting a process plan according to the ISO 14649 on the basis of the manufacturing features;

(d) editing the process plan;

(e) generating an ISO 14649 part program from the edited process plan;

(f) generating a tool path based on manufacturing feature information specified in the ISO 14649 part program; and (e) verifying the produced tool path in a CNC (computer-based numerical control) apparatus.

2. The method of claim 1, wherein the step (c) includes the stages of:

(c1) selecting an machining operation defined by the ISO 14649 for each of the manufacturing features;

(c2) setting process data for the selected machining operation, the process data containing cutting tools information, a machining strategy designating a basic machining pattern, cutting conditions including a tool-accessing/withdrawing method, a cutting depth, an RPM and a feed rate, tool path connecting method and information instructing whether or not to use cutting oil;

(c3) creating workingsteps based on the manufacturing features and the corresponding machining operations;

(c4) grouping the workingsteps in accordance with a setup; and (c5) determining a sequence of the workingsteps.

3. The method of claim 1, wherein the step (d) includes the stages of:

(d1) visualizing and checking the manufacturing features by using a Code Viewer;

(d2) displaying the sequence of the workingsteps on a two-dimensional screen by using a process sequence graph (PSG);

(d3) setting a non-linear process plan by moving and editing a node and an arc of the PSG through the use of a pointing device; and (d4) structuring the non-linear process plan according to the ISO 14649.

4. The method of claim 1, wherein the step (e) includes the stages of:

(e1) generating an ISO 14649 part program for use in a SFP system built in the CNC apparatus (built-in SFP)

or a SFP system separated from the CNC apparatus (external SFP);

(e2) producing a G-code part program for the CNC apparatus based on ISO 6983;

(e3) generating CNC internal data to be used in the built-in SFP system as a direct instruction for operating an axis of the CNC apparatus without undergoing through a separate conversion process; and (e4) verifying the CNC internal data on the CNC apparatus by using a wire and a solid simulation technique.

5. The method of claim 3, wherein the stage (d1) has the steps of:

composing three dimensional visualization data from the manufacturing features;

displaying the 3D visualization data on a 3D screen by using a graphic library;

confirming and editing feature parameters by selecting the manufacturing features on the 3D screen through the use of the pointing device; and reflecting on the part program and the 3D screen the feature parameter selection, confirmation and editing results.

6. The method of claim 4, wherein the built-in SFP system in the step (e1) shares with the CNC apparatus a machining feature database, a machining knowledge database, a machine resource database and a machining process database and generates the ISO 14649 part program and transfers the generated part program to the CNC apparatus, or generates the PSG to the CNC apparatus without producing the ISO 14649 part program while the external SFP system in the step (e1) generates the ISO 14649 part program and transfers the generated part program to the CNC apparatus.

* * * * *